(12) United States Patent
Takano et al.

(10) Patent No.: US 8,477,453 B2
(45) Date of Patent: Jul. 2, 2013

(54) PERPENDICULAR MAGNETIC RECORDING WRITE HEAD WITH MILLING DEFINED TRACK WIDTH

(75) Inventors: Kenichi Takano, Santa Clara, CA (US); Yuchen Zhou, San Jose, CA (US); Min Li, Dublin, CA (US); Joe Smyth, Aptos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 332 days.

(21) Appl. No.: 12/799,927

(22) Filed: May 5, 2010

(65) Prior Publication Data

US 2011/0273800 A1    Nov. 10, 2011

(51) Int. Cl.
*G11B 5/31*    (2006.01)
(52) U.S. Cl.
USPC .................. 360/125.14; 360/125.15
(58) Field of Classification Search
USPC ................ 360/125.1, 125.11, 125.14, 125.15
See application file for complete search history.

(56) References Cited

U.S. PATENT DOCUMENTS

| | | |
|---|---|---|
| 7,251,878 B2 | 8/2007 | Le et al. |
| 7,337,530 B1 | 3/2008 | Stoev et al. |
| 7,394,621 B2 | 7/2008 | Li et al. |
| 7,672,079 B2 | 3/2010 | Li et al. |
| 2010/0277832 A1* | 11/2010 | Bai et al. ................. 360/125.03 |

* cited by examiner

*Primary Examiner* — Craig A. Renner
(74) *Attorney, Agent, or Firm* — Saile Ackerman LLC; Stephen B. Ackerman

(57) ABSTRACT

A main pole layer having at least a leading taper and trimmed pole tip portion is described. The leading taper increases head field up to $\geq 15000$ Oe even for narrow track widths approaching 50 nm. For MAMR applications, a STO and trailing shield are sequentially formed on a trailing pole tip side. Furthermore, full side shields may be added to reduce fringing field. Another embodiment involves including both of a leading taper and trailing taper at the pole tip where leading taper angle is between 20° and 60° and trailing taper angle is from 10° to 45°. A method is provided for forming various embodiments of the present invention. A key feature is that milling depth at an effective neck height distance is greater than or equal to the pole tip thickness. A self aligned STO may be formed by the same ion milling step that defines track width.

6 Claims, 8 Drawing Sheets

PERPENDICULAR MAGNETIC RECORDING WRITE HEAD WITH MILLING DEFINED TRACK WIDTH

FIELD OF THE INVENTION

The invention relates to a main pole in a perpendicular magnetic recording head (PMR) and a method for making the same. In particular, a pole tip region is trimmed to define track width by a milling process and has a leading taper or leading and trailing edge taper so that the main pole becomes thinner at the air bearing surface (ABS) thereby providing large head field and narrow track width.

BACKGROUND OF THE INVENTION

Perpendicular recording has been developed in part to achieve higher recording density than is realized with longitudinal recording devices. A PMR write head typically has a main pole with a small surface area at an air bearing surface (ABS) and a flux return pole (opposing pole) which is magnetically coupled to the main pole and has a large surface area at the ABS. Critical dimensions of the main pole include a neck height and a pole width in a pole tip region adjacent to the ABS. Magnetic flux generated in the main pole layer passes through the pole tip into a magnetic media and then back to the write head by entering the flux return pole.

A PMR magnetic recording head combined with a double layered media has enabled numerous advancements in the technology and a continuous increase in hard disk drive (HDD) recording density beyond 100 Gb/in$^2$. However, as track width shrinks, the write field decreases due to a small pole tip area and pole tip saturation if head-media spacing reduction cannot be applied suitably. As a result, this situation imposes a difficult challenge to achieve 1 Tb/in$^2$. Thus, the lack of a strong write field limits current narrow track recording and presents an earlier obstacle for areal density growth than reaching the media super paramagnetic limit.

Fortunately, new technology options are being explored that promise to provide areal density growth beyond the aforementioned limits. New developments such as bit patterned magnetic recording (BPMR) and heat assisted magnetic recording (HAMR) are attractive but come with considerable risk and significant challenges in terms of manufacturing process, cost, and reliability. On the other hand, another candidate known as microwave assisted magnetic recording (MAMR) is expected to be easier and more practical to implement because the additional component is only a spin torque oscillator (STO) in PMR heads with conventional PMR media. The STO manufacturing process is essentially the same as for current tunnel magnetoresistive (TMR) heads, but is fabricated in the trailing gap between the main pole and trailing shield. Therefore, the main pole and STO must be integrated with the same or similar track width.

Referring to FIG. 1 part (a), a wide main pole 2 is shown with a narrow STO 1a having a width w that is substantially less than the width of the trailing edge 2t of the main pole along the cross track (x-axis) direction. Note that the main pole 2 and STO 1a move in a down track (z-axis) direction over a magnetic media to produce wide written tracks 3 having a width that essentially corresponds to the width of the trailing edge 2t. Since the field generation layer (FGL) of the STO is very thin and field amplitude is limited, the switching field reduction of the media is also limited. In conventional designs, the main pole has to be able to write without any assist but in MAMR designs, the assist by the STO brings further improvement to writing performance. Consequently, it is an advantage for both of the main pole and STO to have a narrow track design. For example, in FIG. 1 part (b), STO 1b has a width w1 essentially equal to that of the trailing edge of main pole 4. In part (c), STO 1c has a width w2 slightly less than main pole 4, and in part (d), STO 1d has a width w3 slightly larger than the trailing edge of main pole 4. As a result, each of the main pole/STO configurations represented in FIG. 1 parts (b)-(d) are able to write narrow tracks 5.

A search of the prior art was performed to identify main pole structures having a narrow pole tip made by ion milling. In U.S. Pat. No. 7,394,621, a method is disclosed for trimming a pole tip by ion milling. The main pole which is not tapered at the ABS is trimmed and then a top yoke is fabricated on the main pole to define a neck height for the pole tip portion.

U.S. Pat. No. 7,337,530 teaches a trimmed and side beveled pole tip where a shield layer is used as a mask to trim the write pole. The S3 shield is trimmed concurrently with the write pole to simplify the manufacturing process and has essentially the same width as the track width of the write pole.

In U.S. Patent Application 2006/0044677, the trailing edge of a pole tip is on a trimmed rectangular shaped portion of the write pole while the leading edge is on a trapezoidal shaped portion of the write pole.

U.S. Patent Application 2006/0002024 describes a write pole with a leading edge taper.

Unfortunately, there is no prior art method available that can be relied upon to fabricate a narrow main pole having a track width approaching 50 nm and an overlying STO having a similar width for MAMR applications. Furthermore, a narrow main pole/STO design is needed that enables a large field at the ABS while minimizing side track erasure.

SUMMARY OF THE INVENTION

One objective of the present invention is to provide a PMR write head with a main pole that has a trimmed width at the ABS of about 50 nm and at least a leading edge taper such that the milling depth at the back end of the pole tip portion is greater than or equal to the pole tip thickness at the ABS.

A second objective of the present invention is to form a leading taper on the pole tip portion according to the first objective and with a taper angle that generates a write field (Heft) of about 15000 Oe and minimizes side track erasure.

Another objective of the present invention is to provide a PMR head having a main pole with leading edge taper on a pole tip portion according to the first two objectives that also includes side shields to suppress the fringing field on adjacent tracks, and includes a STO on the trailing side of the pole tip portion to enable a microwave assisted magnetic recording (MAMR) capability.

These objectives are achieved in a first embodiment of the present invention wherein a main pole is fabricated with a top surface that is essentially planar and perpendicular to the ABS at the trailing edge of the pole tip, a pole tip having a first distance between a trailing edge and leading edge at the ABS, and a tapered side that extends from the leading edge to a bottom surface of the main pole where the bottom surface is essentially planar and formed parallel to the top surface. The pole tip has a track width defined by the width of the trailing edge at the ABS, and has two sides that extend a neck height distance in a direction perpendicular to the ABS and terminate at a first plane formed parallel to the ABS. Thus, a top surface of the pole tip including the trailing edge is coplanar with the top surface of the main pole. There is a bottom surface of the pole tip with a first section adjacent to the ABS that is part of the tapered leading edge of the main pole, and with a second section formed parallel to the top surface that connects the first section to the first plane. As a result of an ion milling process that trims the pole width, there is an exposed surface of the main pole formed coplanar with the second bottom section on either side of the pole tip. The exposed main pole surface has a front edge that extends from the junction of the tapered side and second bottom section in a cross-track direction for a second distance to a long side that is formed perpendicular to the front edge and extends from the front edge to a second plane. The second plane is parallel to the first plane and is on the opposite side of the first plane with respect to the ABS. The two sides of the main pole which are formed between the exposed main pole surface and top surface are each comprised of two sidewall sections which intersect at the first plane and form an angle greater than 90 degrees. Thus, the distance between the two sides of the main pole along the second plane where the second sidewall terminates is greater than the distance between the two sides along the first plane where the pole tip portion terminates.

According to the first embodiment, the PMR head may be further comprised of a STO adjoining the top surface (trailing side) of the pole tip and having a width along the ABS substantially the same as that of the trailing edge. In addition, the PMR head may also include a trailing shield that extends from the ABS along the STO top surface and above a substantial portion of the main pole top surface. Moreover, there may be a full side shield proximate to each side of the pole tip to suppress the fringing field on adjacent tracks. The side shields may connect with the trailing shield.

In a second embodiment, the main pole layer described in the first embodiment is modified to include a tapered trailing edge that extends from the trailing edge of the pole tip to the top surface of the main pole and thereby forms a trailing tapered side that is comprised of three sections. A first section is the top surface of the pole tip portion and extends from the ABS to the first plane. A second section of the trailing tapered side extends from the first plane to the second plane, and a third section connects the second section with the top surface of the main pole. A STO may be formed along the first section of the trailing tapered side in a MAMR embodiment. There is preferably a trailing shield formed on the STO top surface and along a substantial portion of the trailing tapered side such that the side of the trailing shield facing the main pole layer conforms to the trailing tapered side. Furthermore, the second embodiment encompasses side shields proximate to the two sides of the pole tip as in the first embodiment. The side shields may be connected to the trailing shield.

The MAMR structure of the first embodiment may be formed by sequentially depositing a first insulation layer, etch stop layer, and a second insulation layer on a substrate. The two insulation layers may be comprised of alumina and share a common front side that is essentially parallel to the ABS formed in a subsequent step. The second insulation layer is patterned by a reactive ion etch (RIE) step to generate a tapered back side where a bottom surface of the second insulation layer that adjoins the etch stop layer extends a greater distance from the front side than the top surface of the second insulation layer. Thereafter, the main pole layer is deposited on the second insulation layer and on exposed portions of the etch stop layer. A first ion beam milling step is performed to define a track width along the front side of the insulation layer/main pole stack. The ion milling step extends a sufficient distance from the front side to trim a section of main pole layer along the top of the tapered back side of the second insulation layer. Moreover, the ion milling depth is equal to or greater than the pole tip thickness at the ABS. Next, a lapping process is performed to define the ABS by removing a section of the insulation layer/main pole stack adjacent to the front side of said stack.

A method for forming the PMR head of the second embodiment is similar to that for the first embodiment except a first IBE milling step is inserted after the main pole deposition and before the milling step that defines track width. The first IBE milling step forms the trailing tapered side while the second milling step which defines track width has a milling depth greater than or equal to the pole width thickness at the ABS.

BRIEF DESCRIPTION OF THE DRAWINGS

FIG. 3 is a top view of the main pole with trimmed pole tip depicted in FIG. 2a.

FIG. 6 is a top view of the main pole with trimmed pole tip depicted in FIG. 5a.

DETAILED DESCRIPTION OF THE INVENTION

The present invention is a PMR write head for use with magnetic storage media in a disk drive that provides a narrow track width and high head field with minimal side track erasure. A key feature is a main pole layer having at least a leading edge taper and with a track width defined by an ion milling step confined to the pole tip portion where the milling depth is greater than or equal to the thickness of the pole tip at the ABS. The exemplary embodiments include a STO between the pole tip and a trailing shield for MAMR applications. However, those skilled in the art will appreciate that the main pole with trimmed pole tip as described herein may be implemented in general for any PMR write head and is especially beneficial in providing a narrow track width of around 50 nm or less with a high head field. The PMR write head of the present invention may include side shields that connect with the trailing shield. The present invention is also a method for forming a main pole layer having a leading edge taper, or both of a leading edge taper and trailing edge taper, and with a track width defined by an ion milling process.

Figure 1:
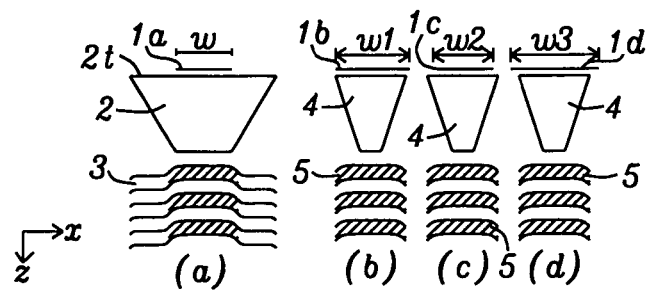
FIG. 1 parts (a)-(d) are cross-sectional views showing various main pole/STO configurations along the ABS and corresponding tracks written by each configuration.
Figure 2A:
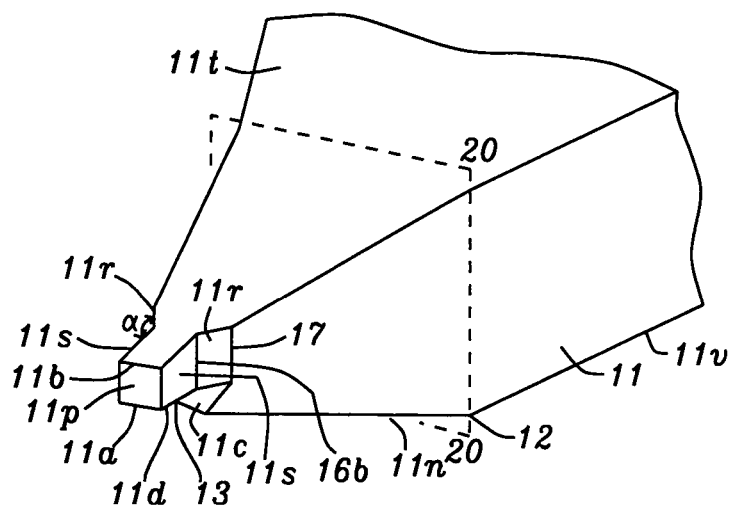
FIG. 2a is an oblique view of a main pole having a leading edge taper and with a pole tip trimmed according to a first embodiment of the present invention.

Referring to FIG. 2a, an oblique view is shown of a main pole layer 11 having a trimmed pole tip 11p according to a first embodiment of the present invention. Surrounding layers including insulation layers and an overlying STO and trailing shield are not depicted in order to simplify the drawing and point out the important aspects of the main pole. The main pole 11 has a planar top surface 11t formed perpendicular to the pole tip 11p at the trailing edge 11b, and a bottom surface 11v aligned parallel to the top surface. The bottom surface is connected to the leading edge 11a of the pole tip 11p by a tapered leading side 11n which intersects the bottom surface along a plane 20-20 that is parallel to pole tip 11p (and the ABS which is not shown). There is only one intersection point 12 along plane 20-20 visible from the oblique view. The pole tip thickness which is the distance between leading edge 11a and trailing edge 11b is from about 40 nm to 100 nm.

A key feature is the pole tip portion that extends from the pole tip 11p in a direction perpendicular to the ABS and terminates along a first plane (not shown) that is parallel to the pole tip 11p and includes edge 16b along each side of the main pole. Thus, there is a side 11s connecting pole tip 11p to the first plane along each side of the main pole 11. Sides 11s also connect the top surface of the pole tip region to a bottom surface that includes a tapered section 11d. In other words, the bottom surface of the pole tip 11p has a first section 11d formed along leading tapered side 11n and that extends from the leading edge 11a to an edge 13 where the first section intersects a front edge of a main pole surface 11c. As explained in a later section, main pole surface 11c is a planar surface formed on either side of the pole tip portion during an ion milling process that defines the track width (width of trailing edge 11b). A second section of the bottom surface of the pole tip portion is comprised of a planar surface (16a in FIG. 2b) formed parallel to top surface 11t and between the edges determined by the intersection of sides 11s with main pole surface 11c. Therefore, the second section of the pole tip bottom surface is coplanar with main pole surface 11c and is formed between sides 11s, and between edge 13 and the back end of the pole tip portion along the first plane as will be explained in more detail later with regard to FIG. 3 which is a top view of the main pole shown in FIG. 2a.

Figure 2B:
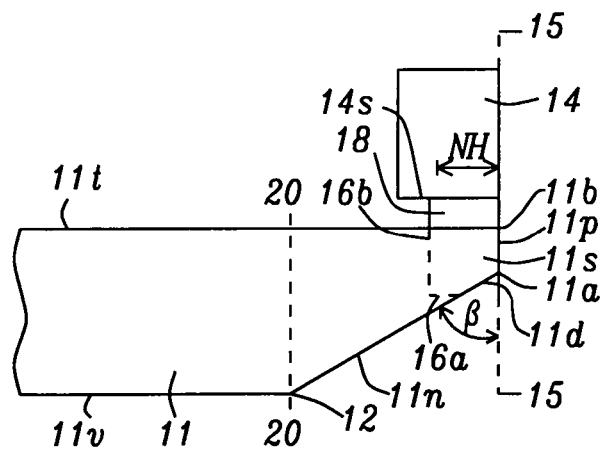
FIG. 2b shows a cross-sectional view of the main pole in FIG. 2a and an overlying STO and trailing shield from a plane that is perpendicular to the ABS.

Referring to FIG. 2b, a cross-sectional view of the main pole 11 is illustrated from a plane (not shown) formed perpendicular to the pole tip 11p and extending toward a back end of the main pole. In the exemplary embodiment that relates to a PMR write head for a MAMR application, there is a spin torque oscillator (STO) 18 contacting the top surface 11t of the main pole and extending for a certain distance from the ABS 15-15. In one aspect, the STO 18 may extend the same neck height (NH) distance from the ABS as the pole tip portion that terminates at edge 16b along the first plane. Furthermore, the trailing shield 14 has a surface 14s facing the main pole 11 that is formed on the trailing side of STO 18 where the STO trailing side is defined as a side opposite the main pole top surface 11t.

Figure 8:
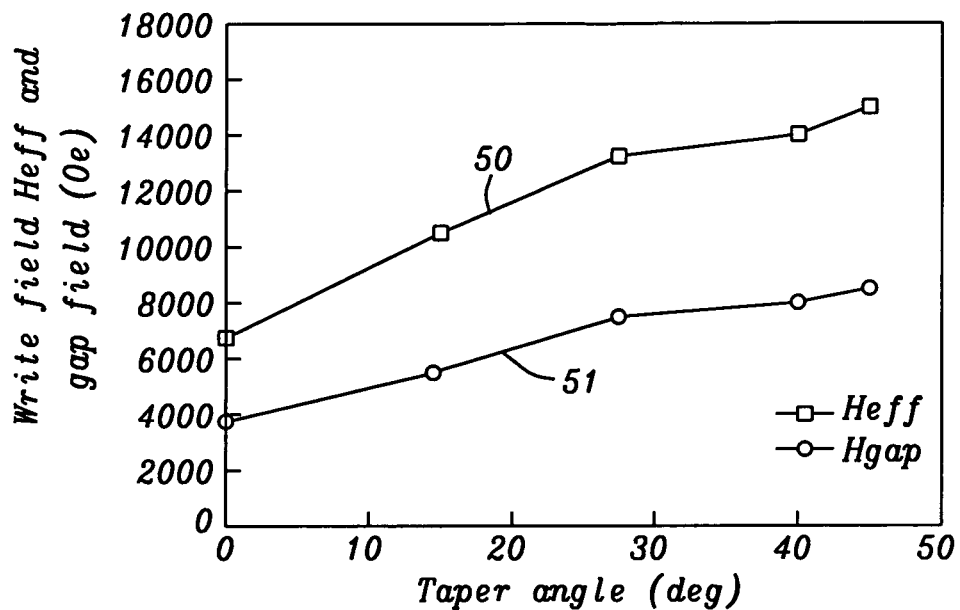
FIG. 8 is a plot of calculated write field ($H_{eff}$) and gap field ($H_{gap}$) as a function of leading taper angle in the main pole of the first embodiment.

An important feature is that the taper angle β formed between tapered leading side 11n and the ABS 15-15 is between 20 and 60 degrees, and preferably greater than 30 degrees in order to produce a sufficiently high head field of about 15000 Oe. Referring to FIG. 8, the taper angle β relationship to the write field ($H_{eff}$) at the media and to the gap field ($H_{gap}$) at the FGL is shown for a main pole 11 represented by FIG. 2b. Note that the gap field is calculated for a STO 18 having a bottom STO configuration (not shown) wherein a seed layer, spin injection layer (SIL), spacer, and FGL are formed sequentially from bottom to top on the trailing edge 11b and trailing side (top surface 11t) of the pole tip region. The definition of the write field is effective head field ($H_{eff}$) in the following equation (1) which is calculated at a media spacing of 17.5 nm from the ABS. $H_{gap}$ is calculated for a distance of 25 nm between the top surface 11t of the pole tip portion and the center of STO 18 where the STO center is midway between top surface 11t and trailing shield 14.

$$H_{eff} = (H_{in}^{2/3} + H_y^{2/3})^{3/2} \quad (1)$$

Here $H_{in}$ is in-plane and $H_y$ is the perpendicular component of the head field to the media. When the taper angle is 0 degrees, the resulting write field is below 7000 Oe which is too weak to write PMR media. By introducing a leading edge taper and a tapered leading side 11n, the write field (curve 50) increases as taper angle increases and reaches 15000 Oe at a taper angle β of 40 degrees which corresponds to the current PMR media anisotropy field at room temperature. Therefore, the main pole 11 of the first embodiment is able to provide a large enough write field and gap field (curve 51) even with a narrow track width of about 50 nm or less.

Returning to FIG. 2b, the cross-sectional view of the milling depth resulting from the ion milling step that trims pole tip 11p is depicted. Edge 16b in this embodiment is formed along the first plane (not shown) and is the same distance from the ABS 15-15 as the back side of STO 18 which is the side formed opposite the ABS. The milling depth is defined as the distance between top surface 11t and pole tip bottom surface 16a that is coplanar with main pole surface 11c in FIG. 2a. Note that the thickness of the pole tip 11p (distance between leading edge 11a and trailing edge 11b) is less than the milling depth. In other words, the distance along edge 16b between top surface 11t and a second section of the pole tip portion bottom surface that is coplanar with main pole surface 11c is greater than the pole tip thickness in the exemplary embodiment. In an alternative embodiment (not shown) where the lapping process forms an ABS at the intersection of pole tip bottom surface 16a and tapered side 11n, then the milling depth will be essentially equal to the thickness of the pole tip 11p at the ABS.

Figure 3:
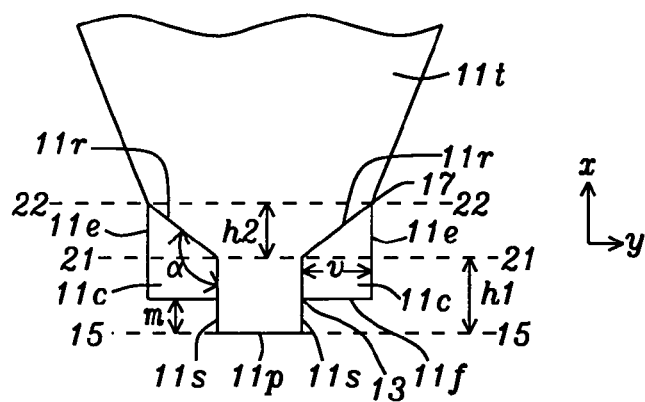

Referring to FIG. 3, a top view of the main pole 11 of the first embodiment is depicted with overlying layers including trailing shield 14 and STO 18 removed. Main pole surface 11c adjacent to sides 11s has a front edge 11f formed parallel to the ABS 15-15 and separated therefrom by a distance m which varies depending on taper angle β. Main pole surface 11c is bounded by side 11s between front edge 11f and the first plane 21-21 and by a side 11r between plane 21-21 and second plane 22-22. Front edge 11f extends a distance v from side 11s along the y-axis direction or parallel to the ABS 15-15 and represents one half of the pole tip width removed during the ion milling process that defines the track width. Main pole surface 11c has a long side 11e that is parallel to the x-axis (perpendicular to the ABS) and which connects front edge 11f to plane 22-22 at intersection point 17. The angle α formed by the intersection of sides 11s and 11r is preferably greater than 90 degrees and less than 180 degrees. Pole tip portion bounded by sides 11s, pole tip 11p, and plane 21-21 extends a distance h1 which is effectively the neck height (NH) of about 70 nm from the ABS. The distance h2 between first plane 21-21 and second plane 22-22 is from 0 to 70 nm. Therefore, the length of side 11e of main pole surface 11c is equal to [(h1+h2)−m]. Note that NH may vary from about 40 to 100 nm and is preferably equal to or greater than the distance that the STO 18 (FIG. 2b) extends from the ABS.

Figure 4:
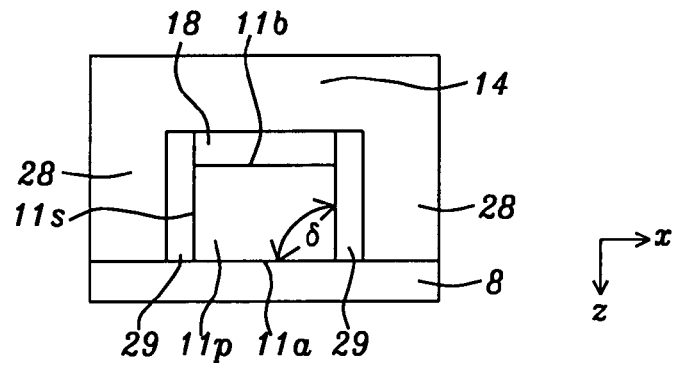
FIG. 4 is a view from the ABS of the main pole in FIG. 2b that has been modified to include side shields according to a second embodiment of the present invention.

According to a second embodiment of the present invention, the PMR head structure shown in FIG. 2b may further include side shields 28 as seen from an ABS view in FIG. 4. Otherwise, all the main pole features of the first embodiment are retained in the second embodiment. As appreciated by those skilled in the art, the addition of side shields is beneficial in suppressing the fringe field and thereby minimizing side track erasure. Preferably, each side shield 28 is a full side shield that extends from trailing shield 14 in a down track direction along the z-axis direction to substrate 8 that may be an insulation layer, for example. Thus, leading edge 11a and the interface of each side shield 28 with substrate 8 are essentially coplanar. Although the exemplary embodiment shows pole tip sides 11s formed at an angle δ of 90 degrees with respect to leading edge 11a, the present invention also anticipates that angle δ may be between 90 and 100 degrees (not shown) to compensate for a well known skew effect. As a result, the length (track width) of trailing edge 11b along the x-axis direction will be larger than the length of leading edge 11a. However, it should be understood that as the leading taper angle increases, the amount of side track erasure is adequately controlled even in an embodiment where 6 is 90 degrees. Moreover, STO 18 is preferably self aligned to pole tip 11p. Side gap 29 is made of a dielectric material and separates the sides 11s and STO 18 from side shields 28. The present invention also encompasses partial side shields (not shown) wherein the side shields contact the trailing shield but do not extend along the full length of the pole tip side 11s. It should be understood, however, that partial side shields will not provide as much advantage in controlling fringing field as full side shields in the preferred embodiment.

Figure 10:
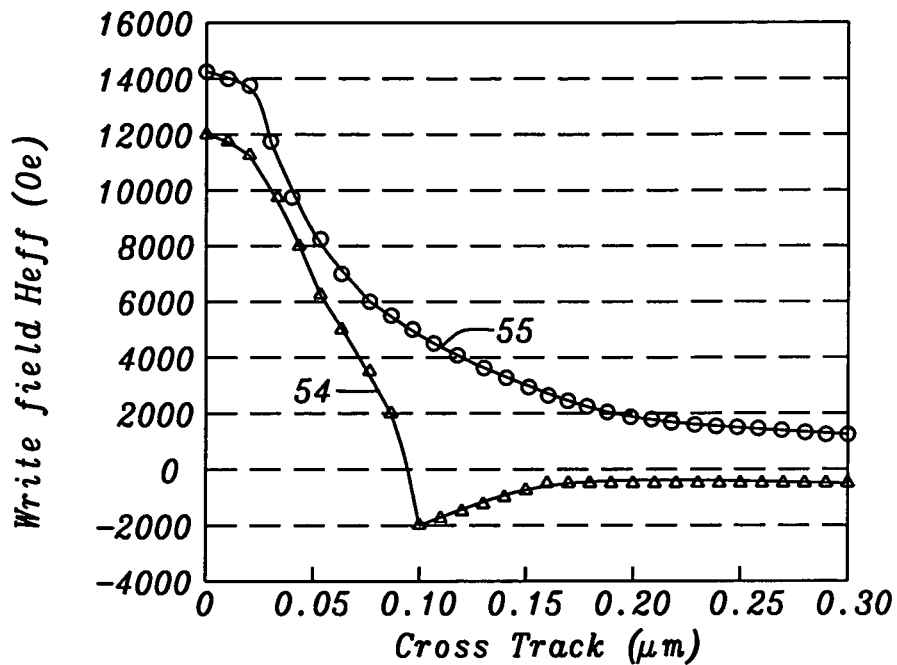
FIG. 10 shows a cross track profile of the write field for the main pole of the first embodiment, and for the second embodiment that has side shields present.

Referring to FIG. 10, the effectiveness is shown of a side shield structure according to the second embodiment in suppressing the fringing field of a main pole with a trimmed pole tip as previously described. Curve 55 represents the cross track profile of a write field generated by a main pole 11 of the first embodiment and curve 54 indicates how the fringing field decreases when a full side shield structure is incorporated as described in the second embodiment of the present invention. Curve 54 demonstrates how the write field is substantially decreased at cross-track distances greater than about 0.08 microns from the pole tip.

Figure 5A:
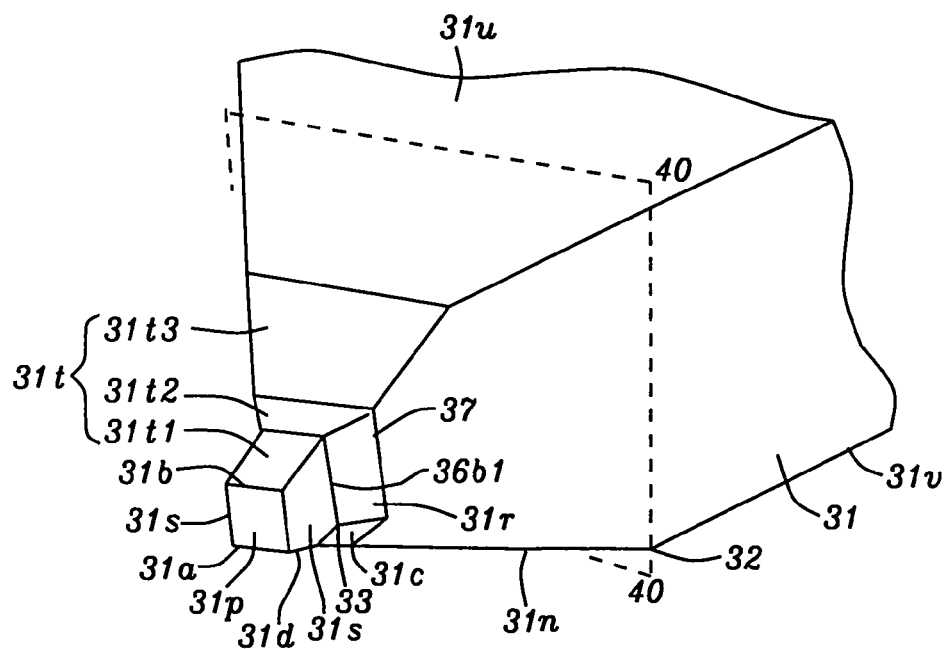
FIG. 5a is an oblique view of a main pole having leading and trailing edge tapers and with a pole tip trimmed according to a third embodiment of the present invention.
Figure 5B:
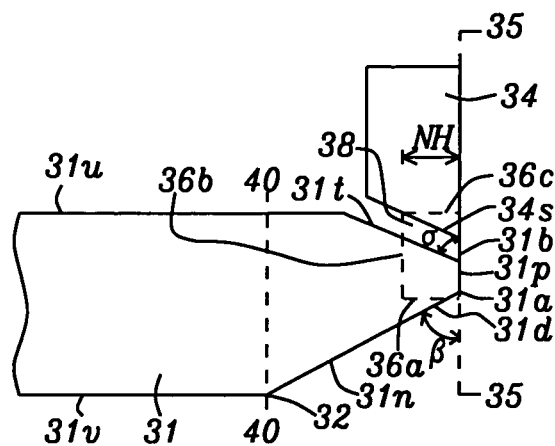
FIG. 5b shows a cross-sectional view of the main pole in FIG. 5a and an overlying STO and trailing shield from a plane that is perpendicular to the ABS.

Referring to FIG. 5a, a main pole 31 formed according to a third embodiment of the present invention is shown from an oblique view and with a cross-sectional view in FIG. 5b along a plane that is perpendicular to the ABS 35-35. Main pole 31 as illustrated in FIG. 5a has a planar top surface 31u that does not extend to the ABS at pole tip 31p but is connected to the trailing edge 31b of the pole tip by a tapered trailing side 31t comprised of sections 31t1, 31t2, 31t3. Moreover, main pole 31 has a bottom surface 31v aligned parallel to top surface 31u and connected to the leading edge 31a by a tapered leading side 31n. Thus, main pole 31 is said to have both a leading taper and a trailing taper. Tapered leading side 31n and bottom surface 31v intersect along a plane 40-40 that is aligned parallel to pole tip 31p. Intersection point 32 is the only location on the plane 40-40 that intersects tapered leading side 31n which is visible from the oblique view in FIG. 5a. Similar to a leading taper, a trailing taper can bring further enhancement of the write field and gap field and $H_{eff}$ increases as the trailing taper angle increases (not shown). Those skilled in the art will appreciate that the third embodiment is a modified version of the first embodiment where the tapered trailing side 31t is employed instead of a planar top main pole surface that extends all the way to the ABS at the pole tip.

A key feature is the pole tip portion that extends from the pole tip 31p in a direction perpendicular to the ABS and terminates along a first plane (not shown) that is parallel to the pole tip 31p and includes edge 36b1 along each side of the main pole. Thus, there are two sides 31s connecting pole tip 31p to the first plane. Sides 31s also connect the top surface of the pole tip portion to a bottom surface that includes a tapered section 31d. In other words, the bottom surface of the pole tip 31p has a first section 31d formed along tapered leading side 31n and that extends from the leading edge 31a to an edge 33 where the first section intersects a front edge of a main pole surface 31c. As explained in a later section, main pole surface 31c is a planar surface formed on either side of the pole tip portion during an ion milling process that defines the track width (width of trailing edge 31 b). A second section of the bottom surface of the pole tip portion is comprised of a planar surface formed coplanar to main pole surface 31c and between the edges determined by the intersection of each side 31s with main pole surface 31c. Therefore, the second section of the pole tip bottom surface is formed between sides 31s, and between edge 33 and the back end of the pole tip portion along the first plane as will be explained in more detail later with regard to FIG. 6 which is a top view of the main pole shown in FIG. 5a.

Referring to FIG. 5b, a cross-sectional view of the main pole 31 is illustrated from a plane (not shown) formed perpendicular to the pole tip 31p and extending toward a back end of the main pole. In the exemplary embodiment that relates to a PMR write head for a MAMR application, there is a spin transfer oscillator (STO) 38 contacting the top surface 31t of the main pole and extending for a certain distance from the ABS 35-35. In one aspect, the STO 38 may extend the same NH distance from the ABS as the pole tip portion that terminates at edge 36b1. Alternatively, STO 38 may extend less than the NH distance from the ABS. Furthermore, the trailing shield 34 has a surface 34s facing the main pole 31 that is formed on the trailing side of STO 38 where the STO trailing side is defined as a side opposite the main pole top surface 31t.

An important feature is that the leading taper angle β formed between the tapered leading side 31n and the ABS 35-35 is between 20 and 60 degrees, and preferably is greater than about 30 degrees in order to produce a sufficiently high head field. When the leading taper angle is 0 degrees, the resulting write field is below 7000 Oe which is too weak to write PMR media. By introducing a leading edge taper with a tapered leading side 31n, and a trailing edge taper with a tapered trailing side 31t, the write field increases as leading and trailing taper angles increase and reaches the current PMR media anisotropy field (15000 Oe) when the leading taper angle β is between 20 and 60 degrees and when trailing taper angle σ is between 10 and 45 degrees. Therefore, the main pole 31 is able to provide a large enough write field and gap field even with a narrow track width of about 50 nm or less. Trailing taper angle σ is preferably between 10 degrees and 45 degrees and contributes to a larger $H_{eff}$ as σ increases.

A cross-sectional view of the milling depth resulting from the ion milling step that trims pole tip 31p is depicted within the rectangle bounded by dashed line 36a on the bottom, dashed line 36b on the left, dashed line 36c on top, and ABS 35-35 on the right side. Edge 36b1 (FIG. 5a) is the portion of dashed line 36b formed between tapered trailing edge 31t and dashed line 36a. In this embodiment, edge 36b1 and dashed line 36b are formed the same NH distance from the ABS 35-35 as the back side of STO 38 which is the side formed opposite the ABS. The milling depth is defined as the distance along edge 36b 36b1 between top surface 31t and dashed line 36a. Note that dashed line 36a is coplanar with main pole surface 31c (FIG. 5a), and the thickness of the pole tip 31p at the ABS 35-35 is less than the milling depth. In an alternative embodiment (not shown) where the lapping process forms an ABS at the intersection of dashed line 36a and tapered side 31n, then the milling depth will be essentially equal to the thickness of the pole tip 31p at the ABS.

Figure 6:
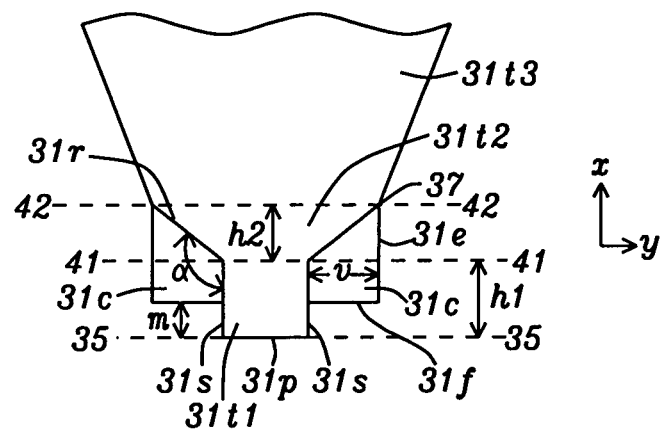

Referring to FIG. 6, a top view of the main pole 31 of the third embodiment is depicted with overlying layers including trailing shield 34 and STO 38 removed. Main pole surface 31c adjacent to sides 31s has a front edge 31f formed parallel to the ABS 35-35 and separated therefrom by a distance m which depends on the leading taper angle. Main pole surface 31c is bounded in part by side 31s between front edge 31f and plane 41-41, and by a side 31r between first plane 41-41 and second plane 42-42. Front edge 31f extends a distance v from side 31s along the y-axis direction or parallel to the ABS 35-35 and represents one half of the pole tip width removed during the ion milling process that defines the track width. Main pole surface 31c has a long side 31e that is parallel to the x-axis (perpendicular to the ABS) and which connects front edge 31f to plane 42-42 at intersection point 37. Angle α formed by the intersection of sides 31s and 31r is preferably greater than 90 degrees and less than 180 degrees. Pole tip portion bounded by sides 31s, pole tip 31p, and plane 41-41 extends a distance h1 (neck height) of about 40 to 100 nm from the ABS. The distance h2 between first plane 41-41 and second plane 42-42 is from 0 to 70 nm. Therefore, the length of side 31e of main pole surface 31c is equal to [(h1+h2)−m]. The first section 31t1 of trailing tapered side 31t is shown between ABS 35-35 and the first plane 41-41 while the second section 31t2 of trailing tapered side 31t is formed between planes 41-41 and 42-42. Third section 31t3 of trailing tapered side 31t connects the second section 31t2 with top surface 31u (FIG. 5a).

Figure 7:
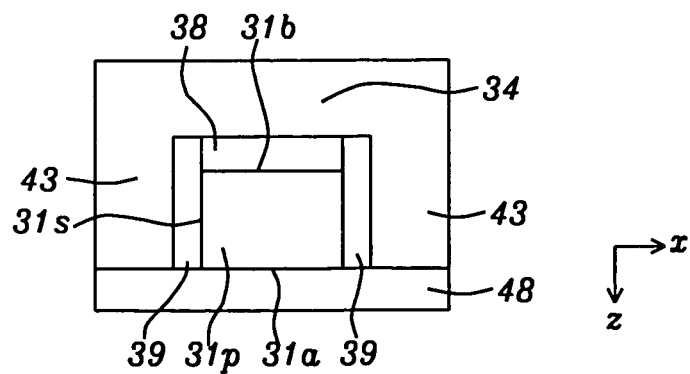
FIG. 7 is a view from the ABS of the main pole in FIG. 5b that has been modified to include side shields according to a fourth embodiment of the present invention.

According to a fourth embodiment of the present invention, the PMR head structure shown in FIG. 5b may further include side shields 43 as seen from an ABS view in FIG. 7. Otherwise, all the main pole features of the third embodiment are retained in the fourth embodiment. As mentioned previously, the addition of side shields is beneficial in suppressing the fringe field and thereby minimizing side track erasure. Preferably, each side shield 43 is a full side shield that extends from trailing shield 34 in a down track direction along the z-axis to substrate 48 that may be an insulation layer, for example. Thus, leading edge 31a and the interface of each side shield 43 with substrate 48 are essentially coplanar. Although the exemplary embodiment shows pole tip sides 31s formed essentially perpendicular to leading edge 31a, the present invention also anticipates that the sides may be sloped at an angle between 90 and 100 degrees such that the length of trailing edge 31b is larger than that of leading edge 31a in an x-axis (cross track) direction to help overcome the skew effect during a writing process. However, it should be understood that the amount of side track erasure is adequately controlled even in the exemplary embodiment with vertical sidewalls 31s because of the leading taper. Preferably, STO 38 is self aligned to pole tip 31p. Side gap 39 is made of a dielectric material and separates the sides 31s and STO 38 from side shields 43. The present invention also encompasses partial side shields (not shown) wherein the side shields contact the trailing shield but do not extend along the full length of the pole tip 31p. However, the advantage is not as great in controlling fringing field as when full side shields are employed.

Figure 9:
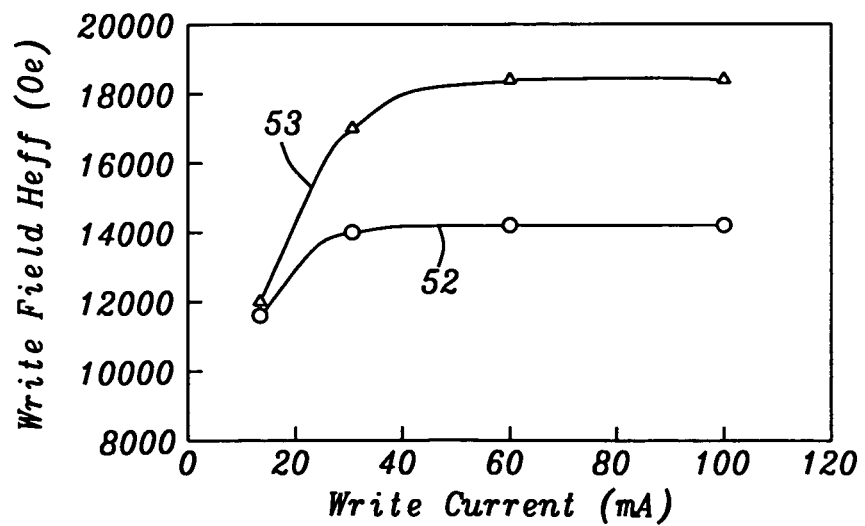
FIG. 9 is plot of write field ($H_{eff}$) as a function of write current for the main pole structures of the first and third embodiments of the present invention.

Referring to FIG. 9, the write field $H_{eff}$ as a function of write current is shown for the first and third embodiments. It is readily apparent that the main pole 31 in the third embodiment comprising a trailing taper and leading taper has a substantially larger $H_{eff}$ (curve 53) than main pole 11 in the first embodiment (curve 52) at the same write current. The plots are generated with a leading taper angle of 40 degrees. For curve 53, the trailing taper angle is 30 degrees.

Figure 11:
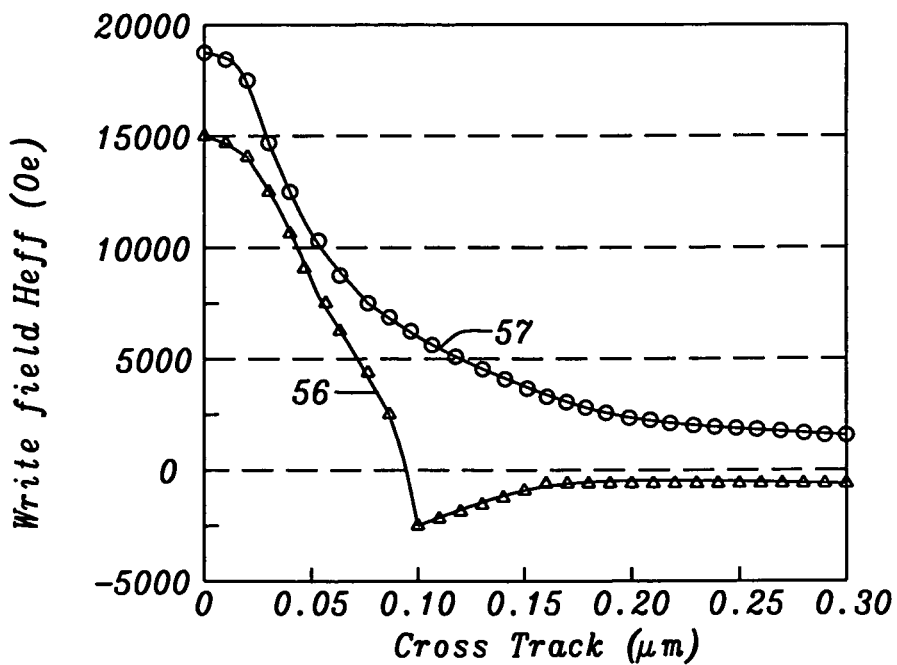
FIG. 11 shows a cross track profile of the write field for the main pole of the third embodiment, and for the fourth embodiment that has side shields present.

Referring to FIG. 11, the effectiveness in suppressing fringing field by addition of side shields to the main pole in the third embodiment is illustrated. Curve 57 shows the cross track profile for a main pole of the third embodiment without side shields and curve 56 shows the cross track profile for a main pole of the fourth embodiment where full side shields are included. Curve 56 demonstrates how the write field is substantially decreased at cross-track distances greater than about 0.08 microns from the pole tip.

Figure 12:
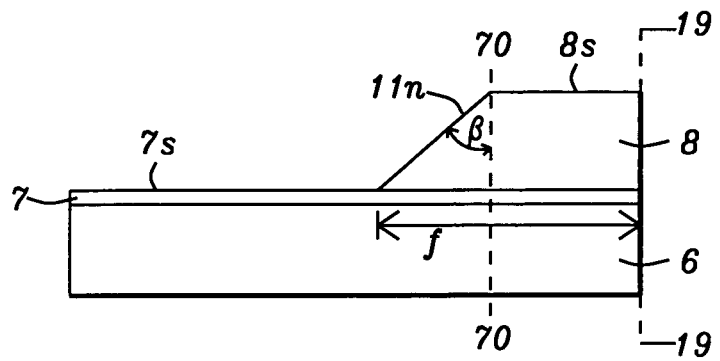
FIGS. 12-14 are cross-sectional views depicting a sequence of steps used to fabricate a main pole having a leading edge taper and with a trimmed pole tip according to a first embodiment of the present invention.
Figure 13:
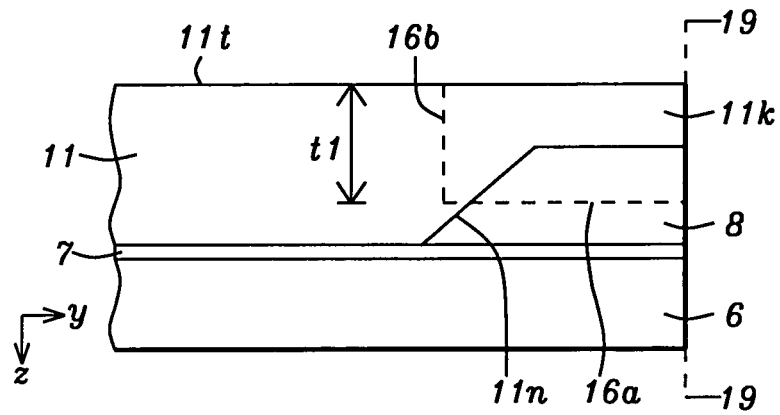
Figure 14:
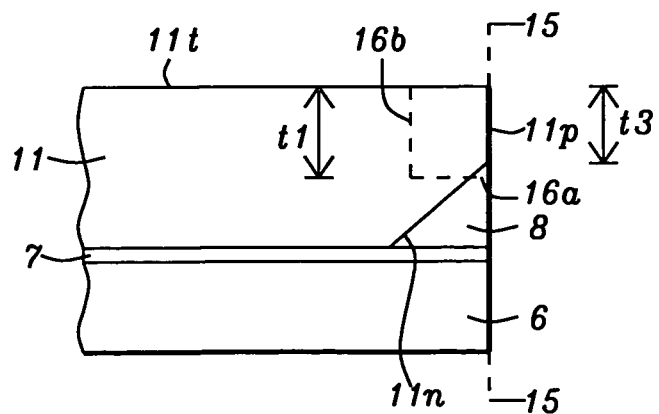

The present invention is also a method of fabricating the aforementioned embodiments wherein a main pole has at least a tapered leading side and a trimmed pole width where the milling depth is less than the thickness of the pole tip at the ABS. FIGS. 12-14 illustrate a process sequence whereby a main pole according to the first embodiment is formed.

Referring to FIG. 12, a first insulation layer 6 made of alumina or the like is deposited on a substrate (not shown) by a method such as chemical vapor deposition (CVD) or physical vapor deposition (PVD). Thereafter, an etch stop layer 7 typically made of Ru and a second insulation layer 8 that serves as a substrate and is comprised of alumina or another dielectric material are sequentially deposited on first insulation layer 6 by conventional methods. Insulation layers 6, 8 have a common front side formed along a plane 19-19 that is proximate to a location where an ABS will be formed in subsequent step. A photoresist (not shown) is coated on top surface 8s and then patterned by a standard lithography process. Next, a reactive ion etch (RIE) step is employed to transfer the photoresist pattern through the second insulation layer 8 at an angle to produce a tapered side 11n having a taper angle β as described previously. Since the ABS has not been formed yet, angle β is shown with respect to a plane 70-70 aligned parallel to plane 19-19 and that intersects the top edge of tapered side 11n at top surface 8s. The RIE step stops on etch stop layer 7 which prevents the RIE process from continuing into first insulation layer 6. Tapered side 11n is sloped such that the interface between the bottom surface of second insulation layer 8 and etch stop layer 7 extends a distance f from the plane 19-19 which is greater than the length of top surface 8s between plane 19-19 and plane 70-70. A certain portion of top surface 7s is uncovered on etch stop layer 7.

Referring to FIG. 13, a cross-sectional view from a plane perpendicular to the plane 19-19 is depicted. The photoresist pattern used during the previous RIE step is removed and another photoresist pattern (not shown) is formed on top surfaces 7s, 8s with an opening that defines where a main pole layer will be deposited in a subsequent step. Thereafter, a main pole layer 11 comprised of a magnetic layer such as CoFe or an alloy thereof is deposited by an electroplating process, for example, on top surface 7s, tapered side 11n, and top surface 8s of second insulation layer within the photoresist pattern opening. The present invention also encompasses a method in which a seed layer is deposited on the surfaces 7s,

8s, 11n prior to deposition of main pole layer 11. Then, a chemical mechanical polish (CMP) step is performed to generate a planar top surface 11t that is parallel to top surface 7s. The second photoresist pattern is removed. The main pole has a front section 11k formed along plane 19-19 and above top surface 8s.

An ion beam milling step is employed to trim the main pole layer 11 including a portion of front section 11k and a portion of the main pole above tapered side 11n. Typically, a photoresist pattern (not shown) is formed on top surface 11t to protect main pole regions that are not to be removed by ion milling. The photoresist pattern is stripped after the ion milling step is completed. Milling depth is represented by t1 and is the length of dashed line 16b in a down track (z-axis) direction between top surface 11t and dashed line 16a. As indicated earlier, dashed line 16a is coplanar with main pole surface 11c (not shown) and intersects tapered side 11n. Dashed line 16b indicates the distance that main pole 11 is trimmed in a direction perpendicular to the plane 19-19. Thus, the ion milling process used to trim the main pole layer occurs within the rectangle bounded by dashed lines 16a, 16b and by top surface 11t and plane 19-19.

Referring to FIG. 14, the main pole 11 is shown after a lapping process is performed to define the ABS 15-15. Main pole front section 11k is removed and a pole tip 11p is formed that connects tapered leading side 11n to top surface 11t. An important feature is that the thickness t3 of the pole tip 11p at the ABS is less than or equal to the milling depth t1. As indicated earlier, if the ABS 15-15 intersects the junction of dashed line 16a and leading tapered side 11n, then a condition exists where t1=t3. One or more insulation layers (not shown) may be deposited to form a side gap and a write gap adjacent to the main pole 11. Then a shield structure (not shown) including a trailing shield or trailing shield with side shields may be deposited by a conventional method as appreciated by those skilled in the art.

In a MAMR embodiment, a STO (not shown) is formed on top surface 11t between dashed line 16b and plane 19-19 by a conventional sequence of steps following the CMP step that produces a smooth top surface 11t. Next, the STO is trimmed simultaneously with main pole 11 during the ion milling step to form a so called self-aligned STO. During the subsequent lapping process, a front portion of the STO above main pole front section 11k is removed so that the STO has a front side at the ABS 15-15 above trailing edge 11b.

Figure 15:
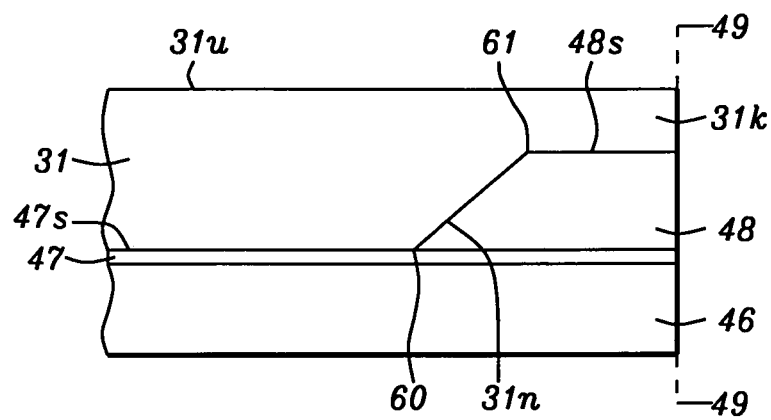
FIGS. 15-18 are cross-sectional views depicting a sequence of steps used to fabricate a main pole having a leading edge taper, a trailing edge taper, and with a trimmed pole tip according to a third embodiment of the present invention.

A fabrication sequence for forming a main pole having both a leading taper and trailing taper according to an embodiment of the present invention is shown with regard to FIGS. 15-18. Referring to FIG. 15, a first insulation layer 46, etch stop layer 47, and a second insulation layer 48 that serves as a substrate are sequentially deposited on a substrate (not shown). Insulation layers 46, 48 may be made of alumina or another dielectric material and have a common front side formed along a plane 49-49 that is proximate to a location where an ABS will be formed in subsequent step. A photoresist patterning step and RIE step as previously described with respect to FIG. 12 are performed to generate a tapered side 31n on second insulation layer 48. Tapered side 31n intersects top surface 47s of the etch stop layer at point 60 that is a greater distance from plane 49-49 than a point 61 where the tapered side intersects top surface 48s. As a result, a certain portion of top surface 47s is uncovered after the photoresist patterning and RIE sequence that defines tapered side 31n on second insulation layer 48.

A main pole layer 31 comprised of a magnetic layer such as CoFe or an alloy thereof is deposited by an electroplating process, for example, on top surface 47s, tapered side 31n, and top surface 48s of the second insulation layer. The present invention also encompasses a method in which a seed layer is deposited on surfaces 47s, 48s, 31n prior to deposition of main pole layer 31. Then, a CMP step is performed to generate a planar top surface 31u that is parallel to top surface 47s. The main pole has a front section 31k formed along the plane 49-49 and above top surface 48s.

Figure 16:
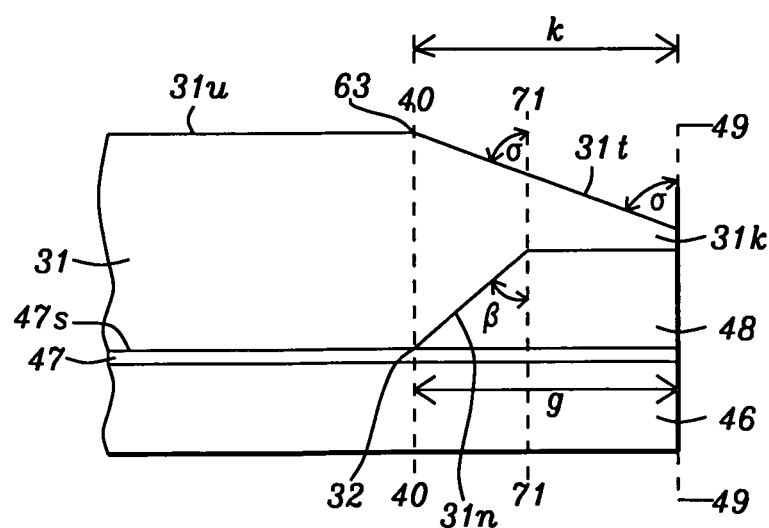

Referring to FIG. 16, a first ion milling step is performed wherein ions are directed toward top surface 31u at a certain angle to form a tapered trailing side 31t that extends from the plane 49-49 to top surface 31u. It should be understood that a photoresist masking layer (not shown) is formed on top surface 31u to protect main pole regions not to be removed during the first ion milling step. Intersection point 63 of top surface 31u and tapered side 31t is a distance k from plane 49-49. Furthermore, intersection point 32 of tapered leading side 31n and bottom surface 31v is a distance g from the plane 49-49. In the exemplary embodiment, plane 40-40 which is parallel to plane 49-49 includes both intersection points 32, 63. However, the present invention also anticipates that the distance k may be larger or smaller than the distance g. The trailing taper angle σ formed between trailing tapered side 31t and plane 49-49 is between 10° and 45°. Leading taper angle β is shown as the angle formed between tapered leading side 31n and plane 71-71 formed parallel to plane 19-19 and intersecting the junction of tapered leading side 31n and top surface 8s. Note that trailing taper angle σ is also formed between trailing tapered side 31t and plane 71-71.

Figure 17:
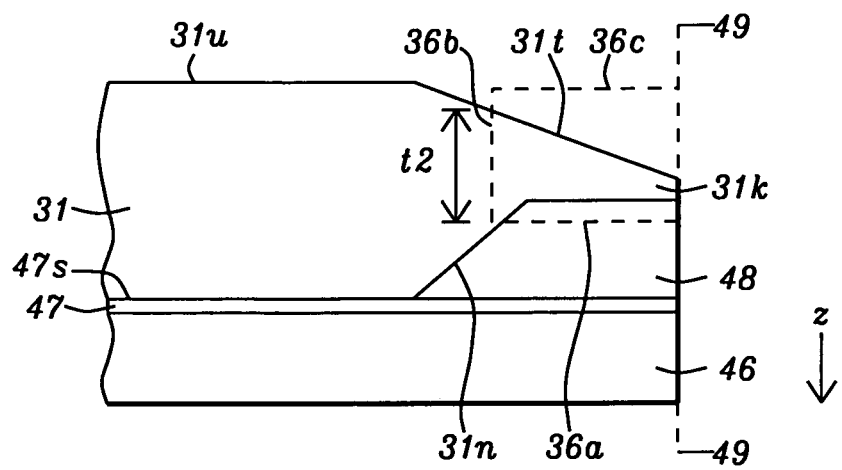

Referring to FIG. 17, a second ion milling step is employed to trim the main pole layer 31 including a portion of front section 31k, a portion of the main pole above tapered side 31n, and a portion of the main pole along tapered trailing side 31t. Milling depth is represented by t2 and is the length of dashed line 36b in a down track (z-axis) direction between tapered trailing side 31t and dashed line 36a which is perpendicular to plane 49-49. Dashed line 36b indicates the distance that main pole 31 is trimmed in a direction perpendicular to the plane 49-49. The upper boundary of the second ion milling step is indicated by dashed line 36c. Thus, ion milling to trim the main pole layer occurs within the rectangle bounded by dashed lines 36a, 36b, 36c, and plane 49-49.

It should be understood that the process flow for each of the ion milling steps described herein typically follows a sequence of photoresist patterning to uncover a main pole region to be trimmed and protect portions of the main pole that are not to be trimmed, performing the ion milling step which may remove portions of adjoining insulation layers, and then removal of the photoresist pattern (mask).

In a MAMR embodiment, a STO (not shown) is formed on the trailing tapered side 31t following the first ion milling step. In the second ion milling step, the STO is trimmed simultaneously with main pole 31 to form a self aligned STO which means the STO has a width along the eventual ABS that is essentially equivalent to the track width (width of trailing edge 31b in FIG. 5a). During the subsequent lapping process, a front portion of the STO above main pole front section 31k is removed so that the STO has a front side at the ABS 35-35 above trailing edge 31b.

Figure 18:
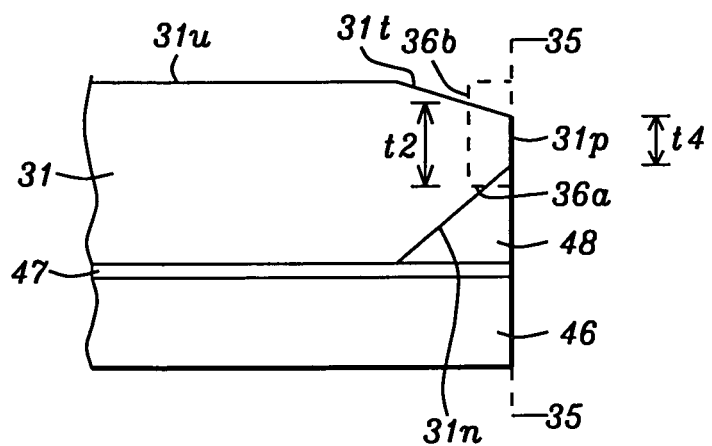

Referring to FIG. 18, a lapping process is performed to remove front section 31k and thereby define the ABS 35-35. Pole tip 31p is formed and connects tapered leading side 31n to tapered trailing side 31t. An important feature is that the thickness t4 of the pole tip 31p at the ABS is less than or equal to the milling depth t2. In an alternative embodiment where the ABS 35-35 intersects the junction of dashed line 36a and tapered leading side 31n, then a condition exists where t2=t4. One or more insulation layers (not shown) may be deposited to form a side gap and a write gap adjacent to the main pole 31. Then a shield structure (not shown) including a trailing shield or trailing shield with side shields may be deposited by a conventional method. Additional insulation layers may be formed on the shield structure to complete the PMR write head as appreciated by those skilled in the art.

The PMR head as described in the various embodiments of the present invention provides an advantage over the prior art in that a narrow track width as small as 50 nm or less may be fabricated with a self aligned STO and still provide a large head field of 15000 Oe or higher. Side track erasure is controlled with a leading taper. Furthermore, a leading taper may be combined with a trailing taper at the pole tip, and side shields may be included to improve performance. A fabrication sequence for making the PMR heads of the present invention may be performed with existing tools and processes to avoid additional manufacturing cost.

While this invention has been particularly shown and described with reference to, the preferred embodiment thereof, it will be understood by those skilled in the art that various changes in form and details may be made without departing from the spirit and scope of this invention.

We claim:

1. A PMR write head with a main pole layer having a planar top surface, and a planar bottom surface that is formed parallel to said planar top surface and connected to an air bearing surface (ABS) by a tapered leading side, said main pole layer comprises:
    (a) a pole tip portion, comprising:
       (1) a pole tip formed along the ABS and having a leading edge where the tapered leading side terminates, and a trailing edge at the ABS and located a pole tip thickness from the leading edge and having a track width in a cross-track direction;
       (2) a top surface that is part of the main pole planar top surface and extends from said trailing edge to a first plane that is parallel to the ABS and is formed a neck height distance from the ABS;
       (3) two sides that are separated by a track width distance along the top surface, and connect the top surface to a bottom surface; and
       (4) a bottom surface with a first section formed along the tapered leading side between the ABS and a main pole surface that is aligned parallel to said planar top surface and has a front edge formed a first distance from the ABS, and a second section that is coplanar with said main pole surface and extends from the tapered leading side to said first plane;
    (b) the main pole surface adjoining the second section of the bottom surface on each side of the pole tip portion wherein the front edge extends a second distance from a side of the pole tip portion in a cross-track direction to a long side that extends from the front edge in a direction perpendicular to the ABS to a second plane formed on an opposite side of the first plane with respect to the ABS, said second plane is parallel to the first plane; and
    (c) a side of the main pole layer formed between the main pole surface and planar top surface, and between the first plane and the second plane.

2. The PMR write head of claim 1 further comprised of a spin torque oscillator (STO) that adjoins the top surface of the pole tip portion, and a trailing shield formed on a side of the STO opposite the top surface of the pole tip portion.

3. The PMR write head of claim 1 wherein the neck height distance is between about 40 and 100 nm, and the pole tip thickness is from about 40 to 100 nm.

4. The PMR write head of claim 1 wherein the tapered leading side has a taper angle between about 20 degrees and 60 degrees with respect to the ABS.

5. The PMR write head of claim 1 wherein a distance between the planar top surface and main pole surface along the first plane is greater than or equal to the pole tip thickness.

6. The PMR write head of claim 1 wherein a side of the main pole layer formed between the first plane and the second plane forms an angle greater than about 90 degrees but less than 180 degrees with respect to an adjoining side of the pole tip portion.

* * * * *